US005614987A

United States Patent [19]

Nishioka et al.

[11] Patent Number: 5,614,987

[45] Date of Patent: Mar. 25, 1997

[54] PRINT DETECTOR FOR USE IN A SORTER

[75] Inventors: Mikiteru Nishioka; Masaaki Kawaguchi, both of Wakayama, Japan

[73] Assignee: Noritsu Koki Co., Ltd., Wakayama, Japan

[21] Appl. No.: 527,803

[22] Filed: Sep. 13, 1995

[30] Foreign Application Priority Data

Sep. 13, 1994 [JP] Japan .................................... 6-218864

[51] Int. Cl.$^6$ ............................ G03B 27/00; B42C 1/12; B65H 39/10

[52] U.S. Cl. ..................... 355/18; 270/58.02; 270/58.18; 271/258.04; 399/18

[58] Field of Search .............................. 355/18, 308, 322, 355/323; 270/58.01, 58.02, 58.03, 58.18; 198/804, 832.1; 271/3.18, 4.07, 4.08, 258.04

[56] References Cited

U.S. PATENT DOCUMENTS 5,342,034 8/1994 Mandel et al. ....................... 270/58.01

5,464,200 11/1995 Nakazato et al. .................... 270/58.01

*Primary Examiner*—Fred L. Braun

*Attorney, Agent, or Firm*—Wenderoth, Lind & Ponack

[57] ABSTRACT

A print detector for use in a sorter capable of detecting photoprints on each of a plurality of print carriers so as to prevent photoprints from being erroneously left on any print carrier. Print carriers are mounted at equal intervals on an endless belt adapted to be driven in one direction. Each print carrier has an optical path block mounted on its underside, i.e. the side that faces downward while the carrier is being fed downward. Each print is also provided with a transparent portion along an optical axis of light reflected obliquely upward by a reflecting end face provided at one end of the optical path block. A light emitter emits light to a light incoming end face of the optical path block. A light interceptor is provided on the optical axis of the light reflected by the reflecting end face, and an alarm device is adapted to be activated if the light interceptor fails to receive light emitted by the light emitter.

1 Claim, 5 Drawing Sheets

PRINT DETECTOR FOR USE IN A SORTER

BACKGROUND OF THE INVENTION

This invention relates to a print detector for use in a sorter for sorting developed and dried photoprints by orders.

A photosensitve material processor is used to print negative images on negative films onto a photosensitive material and develop them. Sensitive materials thus developed are dried and cut into photoprints of a predetermined size in a cutter unit. The photoprints thus obtained are discharged from the cutter unit through a discharge port thereof.

The photoprints discharged are sorted by orders in a sorter. A conventional sorter of this type usually has an endless member adapted to be driven in one direction and having many print carriers mounted thereto at equal intervals. When photoprints for one order lot are placed on one print carrier, the endless member is moved a distance equal to the distance between the adjacent print carriers and is stopped. Photoprints for another order lot are then placed on the next print carrier.

This conventional sorter has no detecting means for detecting whether or not photoprints are on each print carrier. Thus, an operator has to check if there remain photoprints on each carrier. But an operator frequently fails to find and remove photoprints on one or some of the print carriers.

If an operator fails to remove photoprints from any carrier, they will drop from the carrier when it turns around a lower turning point of the endless member, and such photoprints will be scattered. The operator has to pick them up and rearrange them while consulting negative films.

An object of this invention is to provide a print detector for use in a sorter having a detector means capable of detecting photoprints on each print carrier, such detector means being adapted to activate an alarm means if it fails to detect photoprints, thus to prevent photoprints from being erroneously left on any print carrier.

SUMMARY OF THE INVENTION

According to this invention, there is provided a print detector for use in an order sorter having an endless member and a plurality of print carriers mounted on the endless member, the endless member being adapted to be intermittently moved in one direction by a distance equal to the mounting pitch of the print carriers every time photoprints for one order lot have been placed on one of the print carriers. Each print carrier has an optical path block having a light incoming end face at one end thereof, and a reflecting end face formed at the other end thereof for reflecting light directed into the optical path block through the light incoming end face. Each print carrier has a transparent portion in an area where photoprints are to be placed. A light emitter provided at a lower portion of the print carrier moving path emits light at the light incoming end face of the optical path block. A light interceptor is provided on an optical axis of light reflected by the reflecting end face. An alarm means is activated if the light interceptor fails to receive light emitted by the light emitter.

Developed and dried photoprints for one order lot are transferred onto one print carrier that is located at the highest point of the downward feed path. The transparent portion of this carrier is thus covered by the photoprints placed on the carrier. In this state, the endless member is moved a distance equal to the mounting pitch of the print carriers in one direction to move the print carrier carrying the prints one pitch downward.

The prints on the print carrier have to be removed by an operator. But he may fail to do so. When this print carrier is fed downward and stops at the level of the light emitter, the light emitter emits light at the light incoming end face of the optical path block of this print carrier. The light is then reflected obliquely upward by the reflecting end face. If the photoprints are still on the print carrier, i.e. if the transparent portion is still covered by these prints, the reflected light will not reach the light interceptor. If the light interceptor fails to receive the light emitted by the light emitter, the alarm means is activated, thus notifying the operator of the fact that the photoprints are still remaining on the print carrier.

Other features and objects of the present invention will become apparent from the following description made with reference to the accompanying drawings, in which:

DETAILED DESCRIPTION OF THE PREFERRED EMBODIMENT

An embodiment of this invention will now be described with reference to the accompanying drawings.

Figure 1:
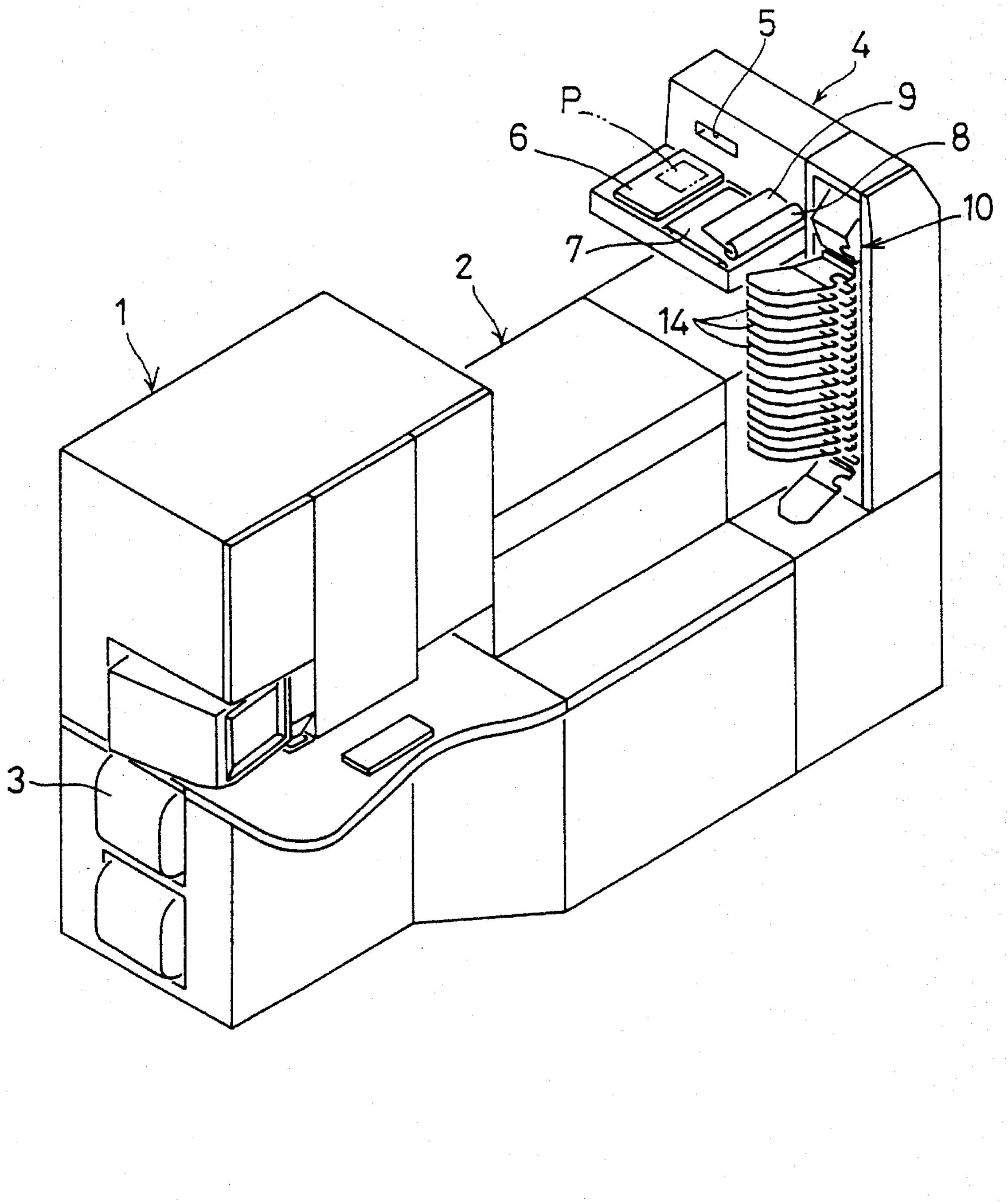
FIG. 1 is an external view of the photosensitive material processor equipped with a sorter according to this invention.

FIG. 1 shows a photoprinting machine. It has a printer unit 1 and a processor 2. In the printer unit 1, negative images recorded on negative films are printed onto a long web of printing paper.

The paper thus printed is fed into processor 2 for development. The developed paper is transferred to a drying unit for drying. The paper thus dried is then cut to a plurality of photoprints P in a cutter unit 4.

The photoprints P are discharged from the cutter unit 4 through a discharge port 5 thereof onto a tray 6.

Every time the tray 6 receives one photoprint P, it tray 6 is inclined toward a conveyor belt 7 provided on one side thereof to slide the photoprint P down onto the conveyor belt 7.

The photoprint P dropped onto the conveyor belt 7 is moved to a delivery end thereof, and is fed into a sorter 10.

A means is provided to feed every photoprint P on the conveyor belt 7 reliably into the sorter 10. It comprises a weight roller 8 provided over the delivery end of the conveyor belt 7 and adapted to rotate by contacting the belt 7, and a cover 9 for guiding photoprints P between the weight roller 8 and the conveyor belt 7. The weight roller 8 accelerates photoprints P when discharged from the conveyor belt 7.

Figure 2:
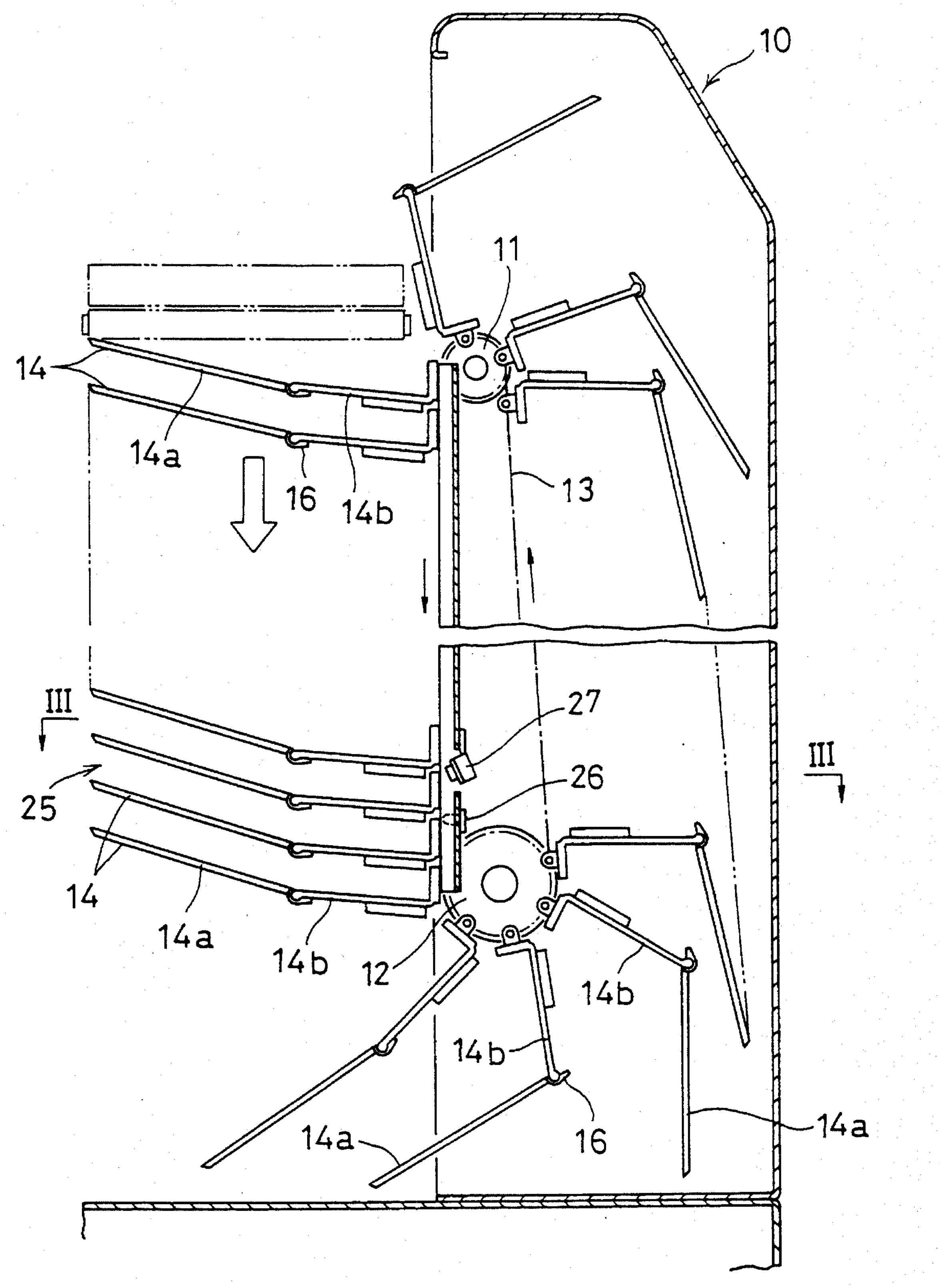
FIG. 2 is a front view in vertical section of the sorter of FIG. 1.

FIG. 2 shows the sorter 10. It has an upper guide wheel 11 and a lower driving wheel 12. A plurality of print carriers 14 are mounted at equal intervals on an endless member 13 passing around the wheels 11 and 12.

In the illustrated embodiment, the guide wheel 11 and the driving wheel 12 are sprockets, while the endless member 13 is a chain, but such are mere examples. The wheels 11 and 12 may be toothed pulleys capable of engaging the endless member 13 in the form of a toothed belt.

The print carriers 14 are made of a transparent or semi-transparent material so that an operator can see through photoprints on any carriers behind other carriers. Each print carrier comprises a front member 14*a* and a rear member 14*b*. The rear member 14*b* is fixed to the endless member 13.

Figure 3:
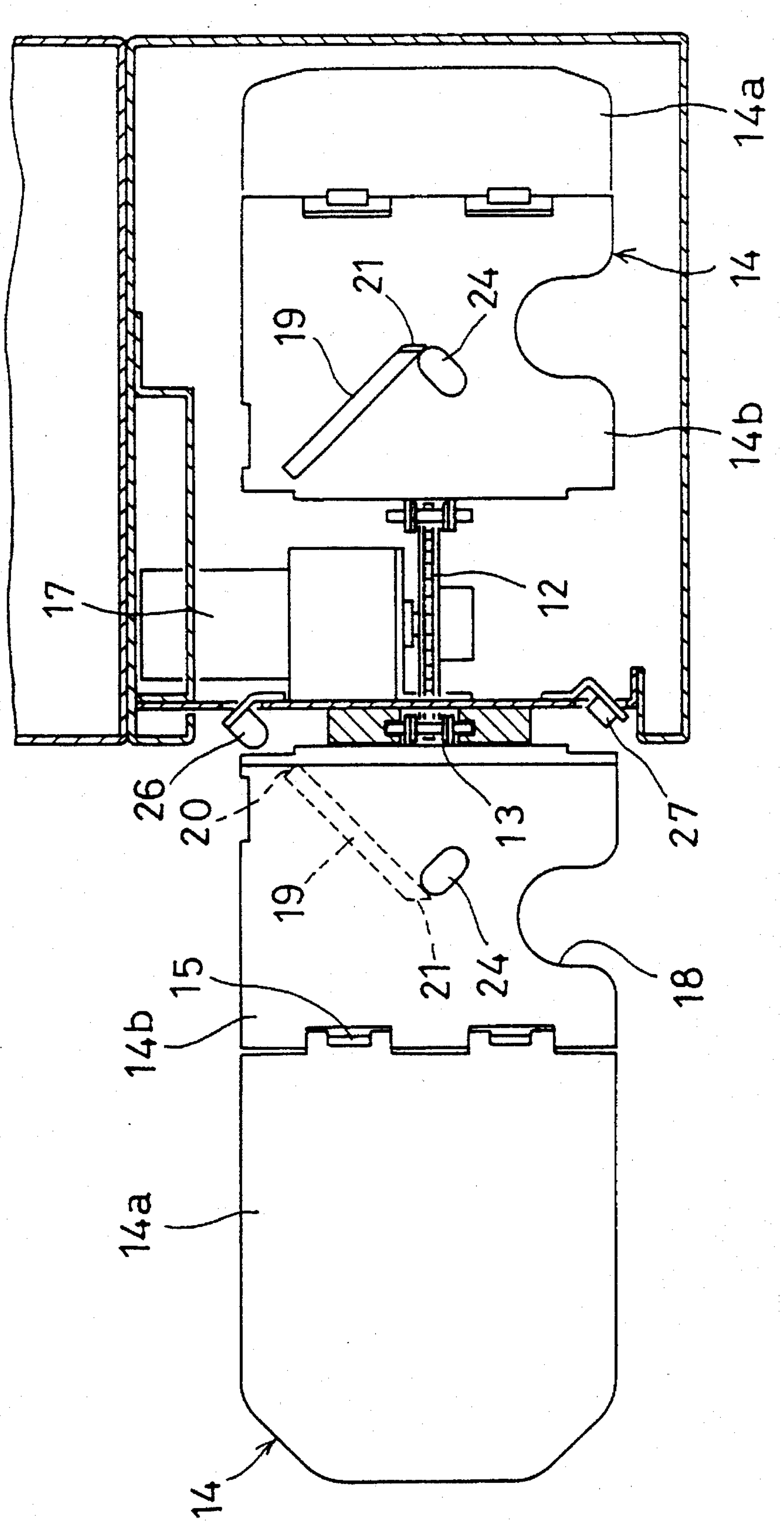
FIG. 3 is a sectional view taken along line III—III of FIG. 2.

As shown in FIG. 3, the front member 14*a* is pivotally coupled to the front edge of the rear member by means of pins 15. The front member 14*a* has fingers 16 at its rear end (FIG. 2).

The driving wheel 12 is intermittently rotated by a motor 17 shown in FIG. 3. For every intermittent rotation of the driving roller 12, the endless member 13 is moved a distance equal to the pitch of the print carriers 14 in the direction of arrows in FIG. 2. When each carrier 14 turns around the upper wheel 11, its front member 14*a* pivots around the pins 15 until the fingers 16 engage the bottom surface of the rear member 14*b* and the front member 14*a* aligns with the rear member 14*b*. The carriers are fed downward, keeping this state.

When each carrier 14 begins to turn around the lower driving wheel 12, its front member 14*a* begins pivoting downwardly under gravity, so that the carrier is bent into the shape of the letter L.

Since the carriers 14 are bent while being fed upward, it is possible to use a smaller sorter than in conventional arrangements in which each print carrier is a single one-piece plate member.

As shown in FIG. 3, a cutout 18 is formed along one side edge of the rear member 14*b* of each print carrier 14 to catch one side of each print P supported on the carrier 14. A square pole-shaped optical path block 19 is mounted on the underside of each rear member 14*b*, while the carriers 14 are being fed down.

The optical path block 19 is made of a highly transparent material, i.e. a material that scarcely absorbs light, such as an acrylic resin. It is inclined with respect to the side edges of each rear member 14*b*, by e.g. about 45° in the illustrated embodiment.

Figure 4A:
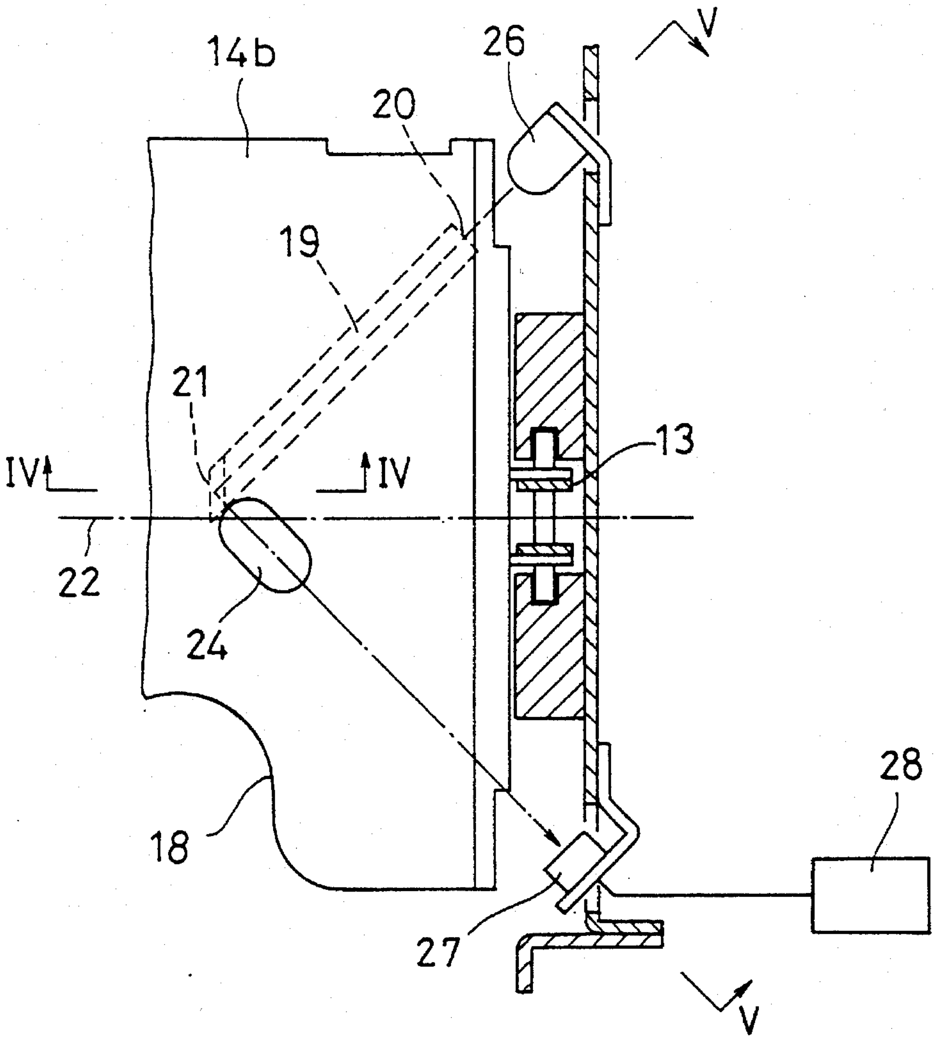
FIG. 4A is a partial enlarged sectional view of FIG. 3.

As shown in FIG. 4A, the optical path block 19 has one end thereof disposed near one rear corner of the rear member 14*b*, and has at this end a light incoming end face 20 that intersects the longitudinal axis of the block 19 at a right angle. The other end of the optical path block 19 is located at the transverse center of the rear member 14*b*, and provided at this end is a reflecting end face 21 to totally reflect the illustrated light coming into the block 19 through its light incoming end face 20 in an obliquely upward direction.

Figure 4B:
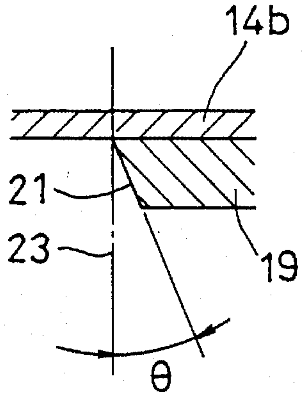
FIG. 4B is a sectional view taken along line IV—IV of FIG. 4A.
Figure 5A:
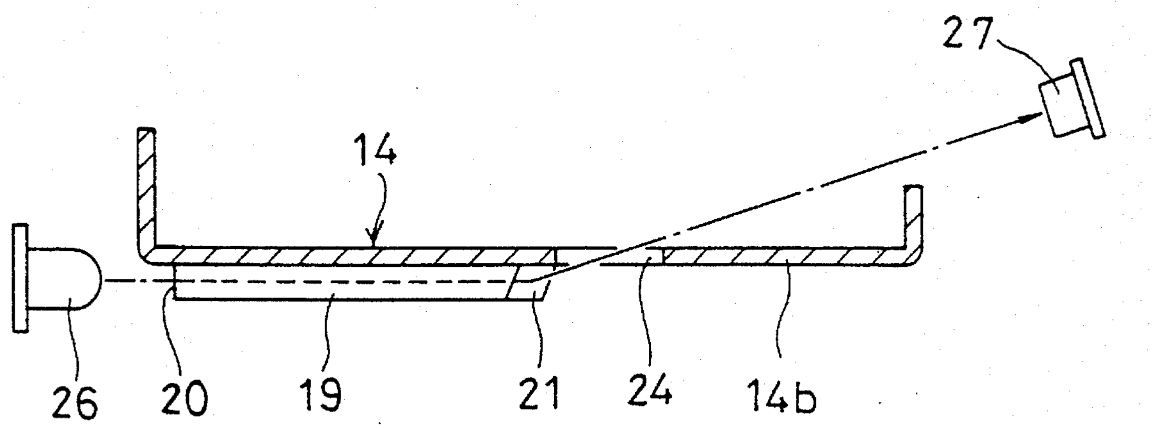
FIGS. 5A and 5B are sectional views taken along line V—V of FIG. 4, showing how photoprints are detected.
Figure 5B:
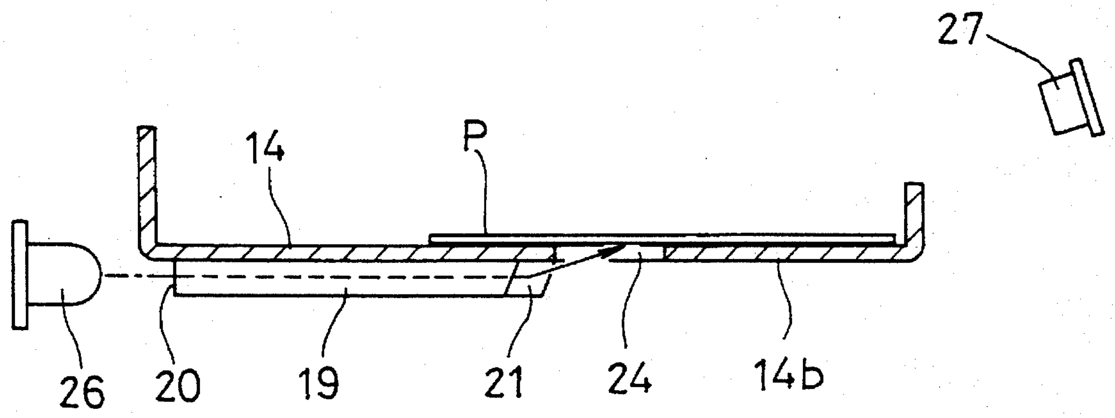

In the embodiment, as shown in FIGS. 4A and 4B, the reflecting end face 21 is inclined by about 45° with respect to the longitudinal direction of the optical path block 19, and by an angle $\theta$ of about 23° with respect to a plane 23 perpendicular to the transverse centerline of the rear member 14*b*.

A portion 24 of the rear member 14*b* on which photoprints P are placed is transparent so that the light reflected by the reflecting end face 21 can pass therethrough.

Referring to FIGS. 2 and 3, near the lower end of the downward path of the print carriers, a detection area 25 is provided in which detection is made of whether or not each carrier is carrying photoprints P. Provided in the detection area 25 are a light emitter 26 for emitting light toward the light incoming end face 20 of the optical light path block 19, and a light interceptor 27 provided along the optical axis of the light reflected by the reflecting end face 21.

The light interceptor 27 is operatively associated with an alarm means 28. If the light interceptor 27 fails to receive the light emitted by the light emitter 26, it activates the alarm means 28.

The alarm means 28 may be a buzzer, a speaker, a lamp, or a display for sounding, flashing or indicating a warning message.

Photoprints P fed from the conveyor belt 7 shown in FIG. 1 are transferred onto the print carriers 14 in the sorter 10 while they are at the highest point of the downward path. Once placed on the carriers 14, the photoprints P cover the transparent portion 24 of each print carrier 14.

Every time photoprints P for one order lot are placed on one print carrier 14, the driving wheel 12 is rotated to move the endless member 13 in the direction of arrows in FIG. 2 by a distance equal to the pitch of the carriers 14.

All the photoprints P placed on the carriers 14 at the highest point of the downward path have to be removed manually from the carriers 14 by the time they reach the lowermost point of the downward path. But a human operator frequently fails to remove prints on one or some of the carriers.

When each carrier 14 comes into the detection area 25 shown in FIG. 2, the endless member 13 is stopped, and the light emitter 26 emits light at the light incoming end face 20 of the optical path block 19.

The light from the light emitter 26 passes through the optical path block 19, and is reflected obliquely upward by the reflecting end face 21.

If the photoprints P placed on the print carrier 14 have been removed therefrom before it comes into the detection area 25, the transparent portion 24 is not covered, so that the reflected light passes through the transparent portion 24 and is received by the light interceptor 27.

If the reflected light is received by the light interceptor 27, the alarm means 28 remains inactive.

If photoprints P are still on the carrier 14, the transparent portion 24 is covered with the prints P, so that the light reflected by the reflecting end face 21 of the optical path block 19 is blocked by the prints P. The reflected light thus cannot reach the light interceptor 27. Failure to receive the reflected light by the light interceptor 27 results in the activation of the alarm means 28. Thus, the operator is notified that he has failed to remove photoprints P.

The light emitter 26 may be turned on every time a print carrier 14 stops in the detection area, or may be kept on at all times. In the latter case, the light interceptor 27 is activated every time a print carrier stops in the detection area.

What is claimed is:

1. A print detector for use in an order sorter having an endless member and a plurality of print carriers mounted on said endless member, said endless member being adapted to be intermittently moved by a distance equal to the mounting pitch of said print carrier in one direction every time photoprints for one order lot have been placed on one of said print carriers, wherein each said print carrier has an optical path block having a light incoming end face at one end thereof, and a reflecting end face formed at the other end thereof for reflecting light directed into said optical path block through said light incoming end face, said each print carrier has a transparent portion in an area thereof where photoprints are to be placed, and said detector further comprises a light emitter provided at a lower portion of a print carrier moving path for emitting light at said light incoming end face of said optical path block, a light interceptor provided on an optical axis of light reflected by said reflecting end face, and an alarm means adapted to be activated if said light interceptor fails to receive light emitted by said light emitter.

* * * * *